United States Patent [19]
Suenkonis

[11] Patent Number: 6,001,246
[45] Date of Patent: Dec. 14, 1999

[54] PROCESS FOR THE RECLAMATION OF PROCESS WATER FROM PROCESS WASTEWATER GENERATED IN THE BATTERY MANUFACTURING INDUSTRY AND OTHER METALS RELATED INDUSTRIES

[76] Inventor: Charles M. Suenkonis, c/o East Penn Manufacturing Co., Lyon Station, Pa. 19536

[21] Appl. No.: 09/080,799

[22] Filed: May 18, 1998

Related U.S. Application Data

[63] Continuation-in-part of application No. 08/848,899, May 1, 1997, Pat. No. 5,783,084.

[51] Int. Cl.$^6$ ....................................................... C02F 1/04
[52] U.S. Cl. .................. 210/180; 159/24.3; 159/27.2; 159/45; 159/46; 202/176; 202/177; 202/202; 210/181; 210/182; 210/199; 210/202; 210/203
[58] Field of Search ............................... 159/22, 45, 46, 159/24.3, 27.2, 27.4; 202/202, 176, 177; 210/199, 180–182, 202, 203

[56] References Cited

U.S. PATENT DOCUMENTS

| | | | |
|---|---|---|---|
| 2,459,302 | 1/1949 | Aronson | 23/121 |
| 2,739,044 | 3/1956 | Ashley et al. | 23/302 |
| 3,864,456 | 2/1975 | Winterfield et al. | 423/551 |
| 3,882,019 | 5/1975 | Burke | 210/726 |
| 3,890,207 | 6/1975 | Chapman et al. | 203/11 |
| 4,024,055 | 5/1977 | Blann | 423/559 |
| 4,069,033 | 1/1978 | Baldassari | 159/47.3 |
| 4,152,218 | 5/1979 | Narita et al. | 203/10 |
| 4,269,810 | 5/1981 | Kolakowski | 423/92 |
| 4,652,381 | 3/1987 | Inglis | 210/724 |
| 5,122,233 | 6/1992 | Zampieri | 202/205 |
| 5,156,706 | 10/1992 | Sephton | 159/47.1 |
| 5,205,906 | 4/1993 | Grutsch et al. | 159/47.3 |
| 5,460,730 | 10/1995 | Czerny et al. | 210/710 |
| 5,472,622 | 12/1995 | Solomon et al. | 210/767 |
| 5,558,775 | 9/1996 | Busch | 210/638 |
| 5,783,084 | 7/1998 | Suenkonis | 210/638 |

*Primary Examiner*—Peter A. Hruskoci
*Attorney, Agent, or Firm*—Zachary T. Wobensmith, III

[57] ABSTRACT

A process wastewater treatment plant, and a process relating thereto, which converts process wastewater generated in battery manufacturing and the like into clean process water and sodium sulfate salt by treating the process wastewater to remove impurities and contaminants, including debris, oil/grease, heavy metal oxides, lead and other heavy metals, suspended solids, bacteria, organic compounds, and/or gases, from the wastewater to obtain a clean neutral sodium sulfate brine, subjecting the brine to heat to obtain distilled water and sodium sulfate salt, and purifying the distilled water by reverse osmosis for reuse as clear process water.

5 Claims, 3 Drawing Sheets

PROCESS FOR THE RECLAMATION OF PROCESS WATER FROM PROCESS WASTEWATER GENERATED IN THE BATTERY MANUFACTURING INDUSTRY AND OTHER METALS RELATED INDUSTRIES

CROSS REFERENCE TO RELATED APPLICATIONS

This application is a continuation in part of my prior application Ser. No. 08/848,899 filed May 1, 1997, now U.S. Pat. No. 5,783,084.

BACKGROUND OF THE INVENTION

1. Field of the Invention

This invention relates to a treatment of industrial process wastewater, and more particularly concerns a process and a process wastewater treatment plant for converting sulfuric acid based process wastewater generated in industry, such as process wastewater generated during the manufacturing and recycling of lead-acid batteries, into (a) sodium sulfate salt and (b) clean water for reuse as process water.

2. Description of the Prior Art

Manufacturing plants, such as plants that manufacture lead-acid batteries and which may recycle scrap lead-acid batteries, generate large quantities of process wastewater from the process water used during manufacturing operations. Typically, such wastewater is disposed of by discharging it into the environment, i.e., into streams and rivers, and because such wastewater contains hazardous and residual waste generated during manufacturing operations, the law requires that the wastewater be treated to remove hazardous and residual waste before the water is discharged into the environment.

Historically, wastewater treatment has presented a challenge for the battery manufacturing industry as well as other metals related industries. It has been difficult or not feasible to remove sufficient quantities of heavy metals, sulfates, and dissolved solids from the wastewater to meet today's strict environmental standards.

Treatment of the wastewater using "Best Available Technology" (BAT) criteria, as currently defined by the Environmental Protection Agency (EPA) for wastewater treatment in the battery manufacturing and other metals related industries, produces a treated wastewater effluent containing high concentrations of dissolved solids (i.e., calcium sulfate) and residual trace concentrations of metals and other inorganics. The calcium sulfate typically is present in concentrations high enough (6,000 to 9,000 ppm (parts per million) to be a potential risk of creating a negative impact on aquatic organisms and drinking water quality. This conventional technology also produces a significant volume of sludge designated as hazardous due to its metals content. The sludge requires further treatment and then disposal, i.e., usually in a landfill.

Further, in metals related industries, large quantities of water are used daily during manufacturing operations. For example, in the lead-acid battery manufacturing industry, hundreds of thousands of gallons of wastewater may be generated each day. Under current practice, this wastewater is first treated, which is costly, before it is discharged into the environment. Over the course of a year, millions of gallons of fresh process water must be obtained since the process wastewater is not recycled, which results in added costs and possible depletion of ground water supplies.

SUMMARY OF THE INVENTION

It is an object of the invention to provide a process and a process wastewater treatment plant for converting sulfuric acid based process wastewater generated in industry into sodium sulfate salt and clean water for reuse as process water.

It is another object of the invention to provide a process and a process wastewater treatment plant for treating sulfuric acid based wastewater generated in industry, which eliminates discharge into the environment of treated process wastewater, and eliminates the creation of substantial quantities of hazardous sludge typically generated using conventional wastewater treatment processes.

Another object of the invention is to substantially reduce the amount of process water needed by metals related industries by providing a process and a process wastewater treatment plant which allows the recycling of process wastewater.

These and other objects are accomplished by providing the inventive process wastewater treatment plant and the inventive process for treating process wastewater generated in metals related industries, such as lead-acid battery manufacturing, which are described below in detail.

DESCRIPTION OF THE DRAWINGS

The nature and characteristic features of the invention will be more readily understood from the following description taken in connection with the accompanying drawings forming part hereof, in which.

It should of course be understood that the description and drawings herein are merely illustrative and that various modifications and changes can be made in the structure disclosed without departing from the spirit of the invention.

Like numbers refer to like parts throughout the several views.

Description of the Preferred Embodiment

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to the drawings there is shown a process wastewater treatment plant and a substantially closed-loop process for converting sulfuric acid based process wastewater generated during manufacturing in metals related industries, such as in the manufacturing and recycling of lead-acid batteries, into (a) sodium sulfate salt and (b) clean process water for reuse in manufacturing operations. The process wastewater, such as that from the manufacturing and recycling of lead-acid batteries, typically may contain sulfuric acid ($H_2SO_4$) in an amount of less than 5% by weight of the process wastewater, as well as debris, oil and grease, lead sediments, dissolved heavy metals such as lead, and trace organic compounds. Treating the process wastewater in accordance with the invention reduces the levels of the contaminants (i.e., the sulfuric acid, debris, oil and grease, lead sediments, dissolved heavy metals, and trace organic compounds) to acceptable levels of less than 1 ppm (parts per million) for suspended solids, less than 1 NTU for turbidity, and less than 10 ppb (parts per billion) for heavy metals including iron.

Figure 1:
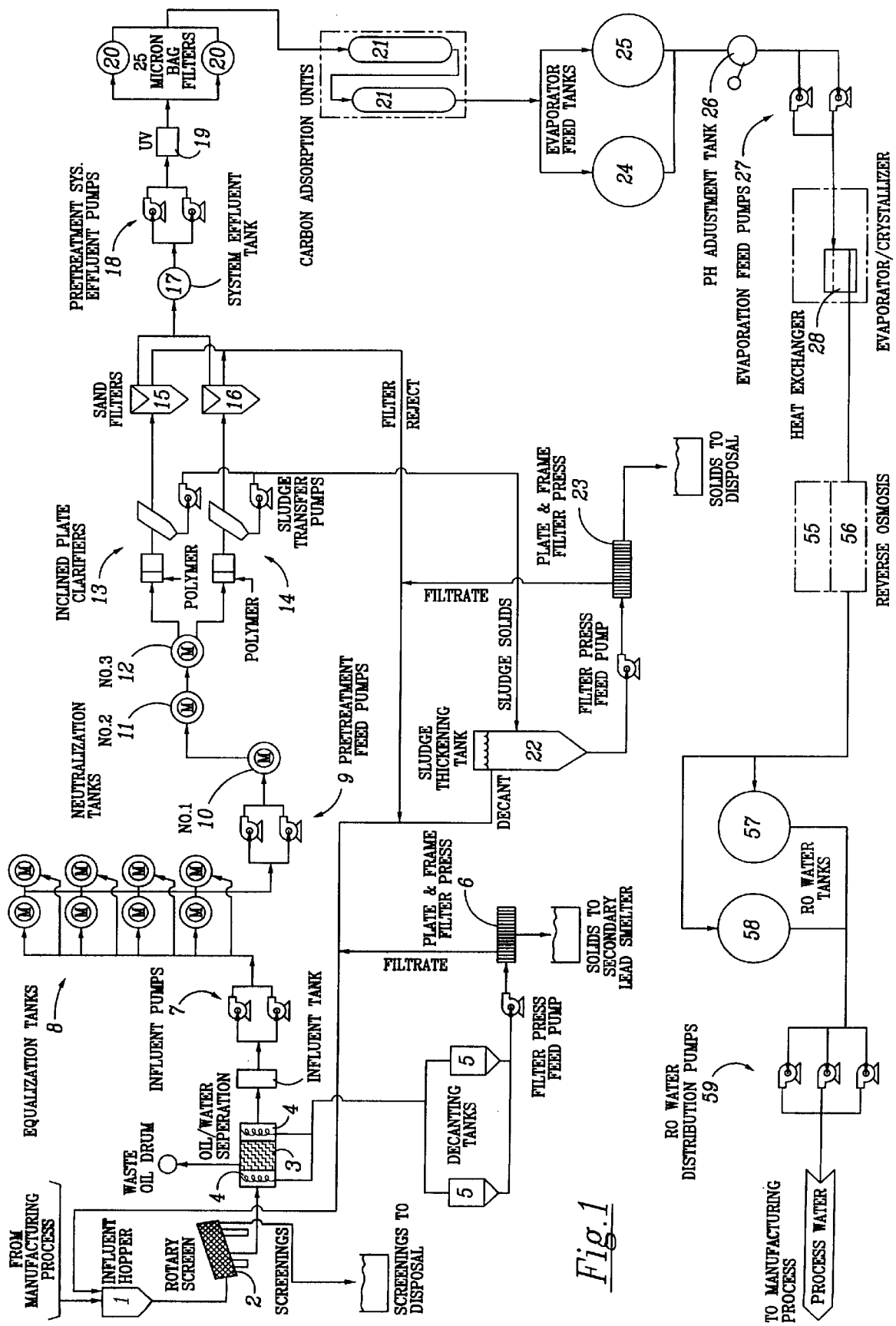
FIG. 1 is a flow diagram showing the inventive process wastewater treatment plant and the inventive process for treating process wastewater.

In accordance with the process wastewater treatment plant and process of the invention, as shown in FIG. 1, process wastewater from the manufacturing and recycling of lead-acid batteries is collected in a feed hopper 1. The process wastewater is fed via gravity flow from the feed hopper 1 through a 40 mesh rotating screen 2 to remove plant debris. The Parkson Corporation Roto-Guard 40 mesh rotating screen, in 316 L stainless steel construction has proven effective for this purpose. The screenings (i.e., the debris) are transported to an appropriate disposal or recovery facility, and the screened process wastewater is fed to an oil/water separator 3 equipped with sediment removal hoppers.

In the oil/water separator 3, any free oil and any free grease float to the upper surface of the process wastewater due to the differences in specific gravity between the oil/grease and water and are removed from the process wastewater, and heavy lead sediments are removed by gravity settling. An exemplary oil/water separator 3 is the Pollution Control Engineering, Inc. oil/water separator, in fiber reinforced plastic (FRP), PVC and 316 L stainless steel construction, which has proven effective in the inventive process wastewater treatment plant.

The oil/grease that is collected by the oil/water separator 3 is transported to an appropriate disposal facility.

The lead sediments are removed from the oil/water separator 3 via screw augers 4 and are transferred to decanting tanks 5, where the sediments settle and compact under gravity settling, and the process wastewater carried therewith is decanted and pumped to the feed hopper 1. The settled lead sediments are fed from the decanting tanks 5 to a low pressure (100 psig) plate and frame filter 16 where the lead solids are pressed into a sludge cake. An exemplary plate and frame filter press 6 is the Netzsch Incorporated filter press, which has proven effective in the process wastewater treatment plant of the invention. The lead sludge cake is transported to a secondary lead smelter for lead recovery.

The process wastewater passed through the oil/water separator 3, free of oil/grease and heavy lead sediments, is fed into a collection tank from where it is pumped via variable speed pumps 7 to a plurality of equalization tanks 8 where mechanical mixers M thoroughly blend the process wastewater to produce a more uniform feed for further processing. Exemplary of tanks 8 and pump 7 are those of fiber reinforced plastic (FRP) construction, which have proven to be effective in the inventive process wastewater treatment plant. Exemplary of the mixers M used in the equalization tanks 8 are LIGHTNIN mixers of 316 stainless steel construction, which have proven to be effective in the process wastewater treatment plant of the invention.

After being thoroughly blended in the equalization tanks 8, the process wastewater is pumped via variable speed pumps 9 to a first neutralization reactor 10 which is equipped with a mixer M, such as a LIGHTNIN mixer, where sodium hydroxide (NaOH) is mixed into the process wastewater to raise the pH of the wastewater from a pH of about 1.0 to a pH of about 3.0. The reactor 10 has at least 75 minutes of holding time based on the maximum flow throughput.

The wastewater exits neutralization reactor 10 over a weir and is piped to the bottom of a second neutralization reactor 11, which is equipped with a mixer M, such as a LIGHTNIN mixer. In neutralization reactor 11, more sodium hydroxide (NaOH) is added to the process wastewater to raise the pH of the wastewater to a pH of about 3.5. Concurrently, ferric sulfate ($FE_2(SO_4)_3$) liquid, commercially available under the trademark Ferri-Floc, is added in a flow proportioned dose of 125–150 ppm (parts per million) of iron (Fe). The ferric iron ($Fe^{+3}$) at a pH of about 3.5 reacts with antimony (Sb) dissolved in the wastewater to chemically adsorb the antimony onto the ferric ion. The wastewater is retained in the second neutralization reactor 11 for a minimum of 75 minutes, which is the required reaction time for stabilized pH control and iron adsorption.

Next, the wastewater exits neutralization reactor 11 over a weir, and is piped to the bottom of a third neutralization reactor 12. In the third neutralization reactor 12, more sodium hydroxide (NaOH) is added to raise the pH of the wastewater to a pH of about 8.0 to 8.5. Concurrently, ferrous sulfate ($FeSO_4$) liquid is added in a flow proportion dose of 100–125 ppm (parts per million) of iron (Fe). The ferrous iron ($Fe^{+2}$) at a pH of about 8.0–8.5 reacts with oxygen provided through an air sparger connected to the neutralization reactor 12 to oxidize the ferrous iron and coprecipitate the iron along with other heavy metals. In addition to this coprecipitate mechanism, heavy metals are also removed via adsorption onto the precipitate iron ($Fe^{+3}$) solids. The neutralization reactor 12 is equipped with a mechanical gas distribution/turbine type mixer M, such as a LIGHTNIN mixer, which aids in oxygen transfer and provides ample mixing.

The neutralized and chemically treated wastewater exits the neutralization reactor 12 over a flow splitting weir, and is fed equally to each of two inclined plate clarifiers 13 and 14, each of which are equipped with a flash mixing and flocculation chamber. An ionic polymer, such as Hydrodynamics HD-8903, is added to the process wastewater in a flow proportioned dose of 0.5–1.0 ppm (parts per million) into each flash mixing and flocculation chamber, where the polymer causes the heavy metal hydroxide precipitates to agglomerate, settle by gravity, and separate from the liquid portion of the treated wastewater. The heavy metal solids (i.e., the heavy metal hydroxide precipitate) form a sludge and are removed from the bottoms of the clarifiers 13, 14.

This heavy metal solids sludge is transferred to a gravity thickening tank 22 for storage and subsequent dewatering in a high pressure (225 psig) plate and frame filter press 23, such as the Netzsch Incorporated filter press which has proven effective for this purpose. The process water separated from the sludge in the sludge thickening tank 22 is decanted from the sludge in the sludge thickening tank 22, and fed back to the feed hopper 1. The solids accumulated from the plate and frame filter press 23 are collected and subsequently recycled by processing them in a smelter to recover lead, while the filtrate from the plate and frame filter press 23 is fed back to feed hopper 1.

The liquid portion of the process wastewater overflows the velocity control weirs of the clarifiers 13, 14 and flows into sand filters 15, 16, entering each sand filter 15, 16 by gravity (differential gravity head). The sand filters 15, 16 remove any suspended solids which escape the clarifiers 13, 14. The Parkson Corporation Lamella gravity plate settler of 316 L stainless steel construction and the Dyna-Sand filter of FRP (fiber reinforced plastic) and 316 L stainless steel construction have proven effective for this purpose.

After treatment through the clarifiers 13 and 14 and the sand filters 15 and 16 the process wastewater normally has a suspended solids concentration which has been reduced to a concentration of less than 1 ppm (parts per million).

The process wastewater from the sand filters 15 and 16, that is, the sand filter effluent, flows from the sand filters 15 and 16 into a collection tank 17. From there, it is transferred via variable speed pumps 18 through an ultra violet (UV) purifier 19, such as the Ideal Horizons UV unit of 316 L stainless steel construction, to kill bacteria in the treated process wastewater, a 25 micron polypropylene bag filter 20, such as the Ronnigen-Petter bag filter housings of 316 L stainless steel construction with commercially available 25 micron disposable bags, to remove fine particulate that escapes the sand filters 15 and 16, and granular activated carbon adsorption unit(s) 21, such as the U.S. Filter-Westates Carbon adsorption unit(s) constructed of FRP (fiber reinforced plastic) lined carbon steel vessels and 316 stainless steel piping and appurtenances and filled with acid washed bituminous based carbon, to remove trace organic compounds from the treated wastewater, and which waste water flows into evaporator feed tanks 24 and 25, resulting in a clean sodium sulfate brine suitable for feed to the evaporation/crystallization portion of the invention. The bag filters 20 also help prevent premature fouling of the carbon adsorption unit(s).

The process wastewater collected in evaporator feed tanks 24 and 25 is fed to a pH adjustment tank 26 where sulfuric acid ($H_2SO_4$) is added to the process wastewater to lower the pH of the process wastewater from a pH of about 6.5–7.5 to a pH of about 5.5 to convert carbonates and bicarbonates into carbon dioxide. A scale inhibitor such as Calgon EL-5600 is added to the feed to prevent fouling of the feed heat exchanger. The process water is transferred via variable speed pumps 27 from the pH adjustment tank 26 to a plate and frame heat exchanger 28 where the process wastewater is heated by the distilled water leaving the evaporator/crystallizer portion of the invention. The distilled water leaving the heat exchanger 28 is cooled to within 6° F. of the temperature of the process wastewater being pumped into the heat exchanger 28 from the pH adjustment tank 26. An exemplary heat exchanger is an APV heat exchanger of titanium construction, which has proven effective in the invention.

As shown in FIG. 1, after being heated in the heat exchanger 28, the process water is conveyed to a deaerator 29 where dissolved gases like oxygen ($O_2$) and carbon dioxide ($CO_2$) are removed prior to the process wastewater being conveyed to an evaporator 30.

Figure 2:
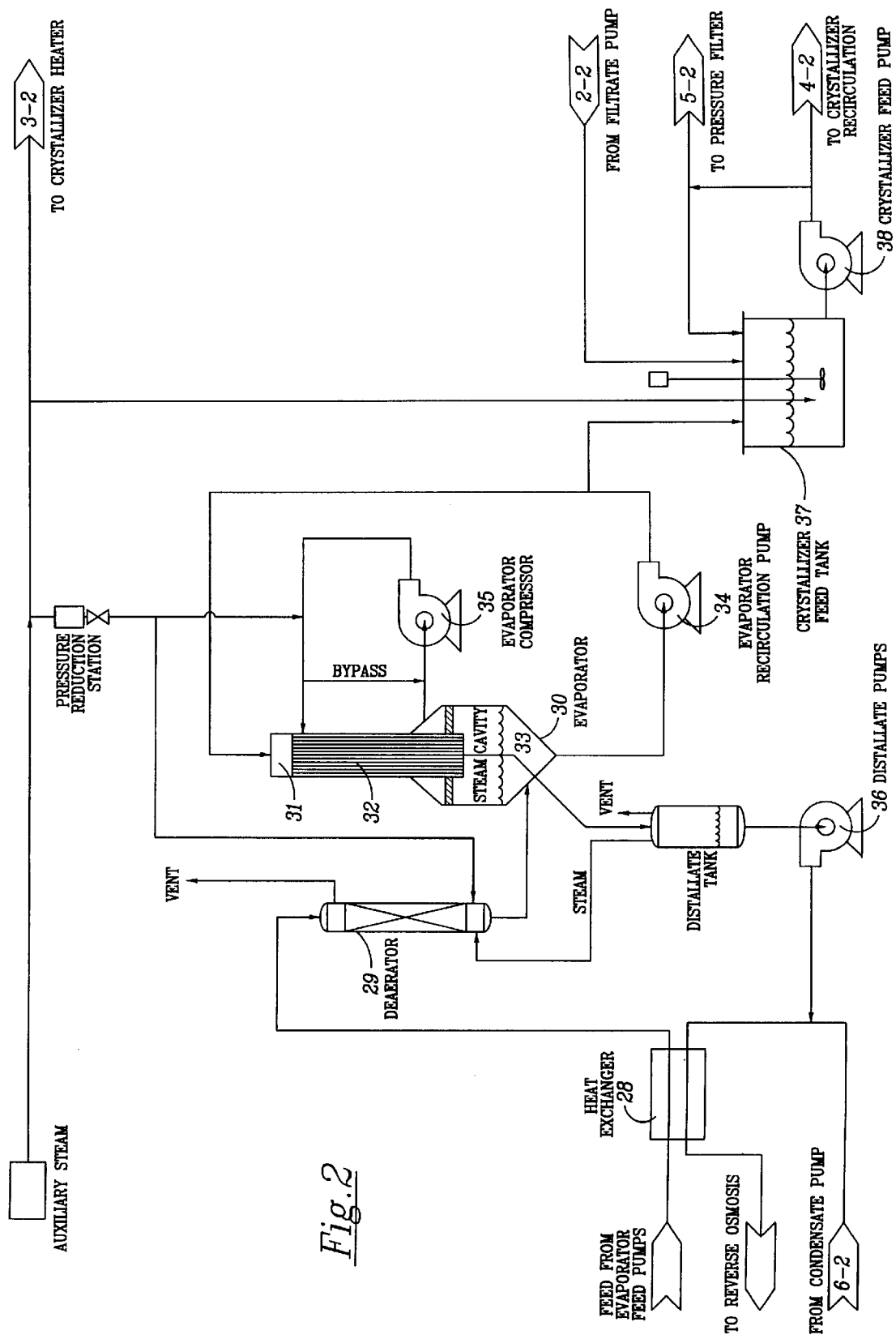
FIGS. 2 and 3 are flow diagrams showing the details of the evaporator unit and crystallizer unit of the invention and the process steps relating thereto.

Again looking at FIG. 2, the evaporator 30 (i.e., an evaporator made by Resources Conservation Company (RCC), a division of Ionics Incorporated) comprises a flood box 31 set atop a vertical shell and tube condenser 32, which is set atop a sump 33, into which the deaerated process wastewater is fed (i.e., deaerated sodium sulfate brine) from the deaerator 29. A pump 34 continuously recycles the brine from the sump 33 to the top of the flood box 31, where the brine is evenly distributed to each of the tubes in the vertical condenser 32. Distributors at the top of each tube of condenser 32 cause the brine to flow in a thin film down the inside of each tube.

Steam injected on the outside of each tube of the condenser 32 transfers heat to the recirculating brine causing water in the water portion of the brine to evaporate, and the brine to become more concentrated. The evaporating water produces steam which accumulates in the sump 33 above the liquid level of the sump 33, and this steam is drawn up from the sump "steam cavity" through stainless steel mist elimination pads, and into the suction side of an electrically driven mechanical vapor compressor 35. The compressor 35 increases the temperature and pressure of the steam and reinjects the steam onto the shell side of the condenser 32. The steam transfers its heat through the tube walls of the condenser 32, the steam forming distilled water as it cools. Steam and distilled water from the shell side of the condenser 32 is collected in a distillate tank. Steam in the distillate tank is fed back to the deaerator 29, and the distilled water collected in the distillate tank is pumped via distillate pumps 36 to the heat exchanger 28 to preheat the sodium sulfate brine prior to being fed to the deaerator 29. Auxiliary steam is fed through a pressure reduction station to supply steam to the deaerator 29 as needed, and to the steam line from the compressor 35 as needed. Also, a steam bypass line is provided between the steam line from the compressor 35 and the steam line leading into the compressor 35.

The concentrated brine produced by evaporation 30 is purged from the evaporator recirculation line to maintain a fixed density, preferably about 1.09, in the evaporator sump 33. The purged concentrated brine, that is, the brine blowdown, is transferred to a crystallizer feed tank 37 of a crystallizer unit to await further processing.

Figure 3:
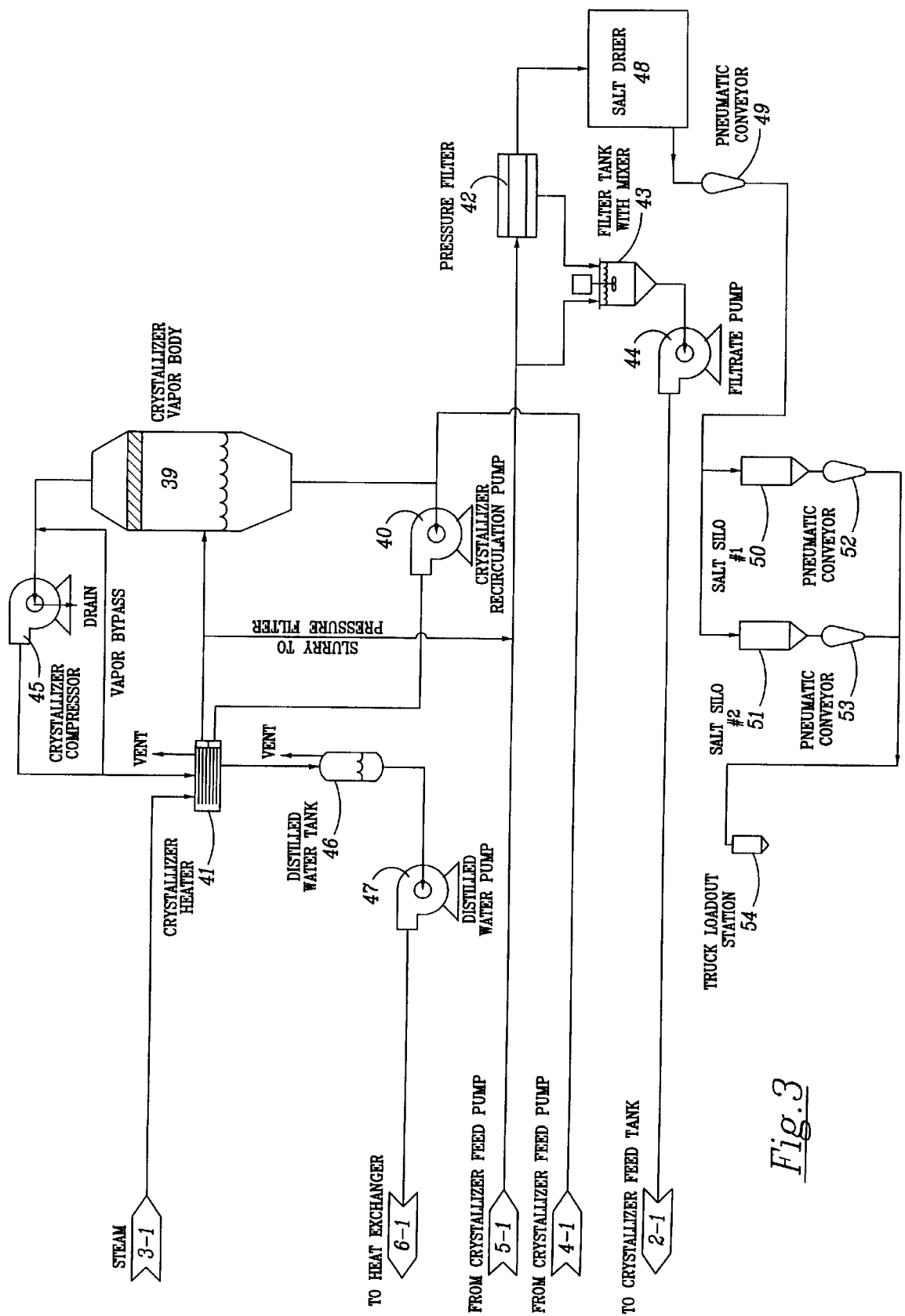

As shown in FIGS. 2 and 3, the crystallizer unit (i.e., a crystallizer made by Resources Conservation Company (RCC), a division of Ionics Incorporated) comprises the crystallizer feed tank 37, a crystallizer feed pump 38, a crystallizer vapor body 39, a crystallizer recirculation pump 40, a shell and tube heater 41, a pressure filter 42, a filtrate tank 43, and a filtrate pump 44. The crystallizer unit concentrates the brine from the evaporator 30 by continuously removing distilled water from the brine fed into the crystallizer unit until a salt crystal slurry is formed.

The crystallizer feed pump 38, shown in FIG. 2, circulates brine from the crystallizer feed tank 37 to a crystallizer vapor body feed inlet valve, to the pressure filter 42, shown in FIG. 3, and to the filtrate tank 43 equipped with a mixer M. shown in FIG. 3.

The crystallizer recirculation pump 40 transfers slurry from the crystalizer feed pump 38 and from the bottom of the crystallizer vapor body or vessel 39 through the shell and tube heater 41, and into the top of the crystallizer vapor body 39, creating a vortex in the slurry in the crystallizer vapor body 39 to keep the slurry in the crystallizer vapor body 39 well mixed, and to enhance the vaporation of water from the slurry.

The steam formed by the evaporation of water in the crystallizer vapor body 39 is drawn up through chevron type liquid entrainment separators of the crystallizer vapor body 39, and into the suction side of an electrically driven, positive displacement, mechanical vapor compressor 45. The compressor 45 increases the temperature and pressure of the steam and injects the steam into the shell side of the shell and tube heater 41. The steam heats the recirculating slurry inside the tubes of the heater 41, giving up its heat and forming distilled water. Auxiliary steam may be fed into the crystallizer heater 41, as needed.

The distilled water from the heater 41 is collected in a distilled water tank 46, and is fed by distilled water pumps 47 to the heat exchanger 28 after the distilled water pumped from the pumps 47 is combined with the distilled water pumped via the pumps 36 from the distillate tank of the evaporator 30.

The concentrated slurry in the crystallizer vapor body 39 is purged periodically from the recirculation line leading into the crystallizer vapor body 39 to maintain a desired density, preferably about 1.5, in the crystallizer vapor body 39. The purged slurry is transferred to the belt and platten type pressure filter 42 (i.e., an Oberlin Pressure Filter) where salt crystals are harvested, and the filtrate from the filter 42 is fed to the filtrate tank 43 and pumped via the filtrate pump 44 to the crystallizer feed tank 37.

The salt crystals harvested in filter 42 are fed to a natural gas fired dryer 48 where any water remaining in the crystals is removed. The Wyssmont Turbo-Tray dryer has proven effective for this purpose. The resulting anhydrous sodium sulfate salt is transported on a pneumatic conveyer 49 (i.e., Cyclonaire pneumatic conveyor.) to silos 50, 51 for storage. Pneumatic conveyers 52, 53 (i.e., Cylonaire pneumatic conveyers) may be used to transport the salt from the storage silos 50 and 51 to truck load-out station 54 where the salt may be loaded into trucks for shipment.

The distilled water from the evaporator 30 and the crystallizer unit is pumped through the heat exchanger 28 where the heat from the distilled water is transferred to the process wastewater being pumped through the heat exchanger 28, from the pH adjustment tank 26, and the distilled water leaving the heat exchanger 28 is cooled to within 6° F. of the temperature of the process wastewater being pumped through the heat exchanger 28 from the pH adjustment tank 26. Turning to FIG. 1, this cooled distilled water is blended with makeup water (potable water), as needed, and fed to reverse osmosis (RO) units 55, 56 (i.e., a reverse osmosis (RO) unit made by Ionics, Incorporated) for removal of the mineral content in the makeup water and for removal of dissolved solids carryover in the distilled water. The reverse osmosis (RO) units 55, 56 produce high quality permeate having a dissolved solids concentration of less than 2 ppm (parts per million), excluding any dissolved carbon dioxide ($CO_2$) from the potable water supply. The permeate from the reverse osmosis (RO) units 55, 56 is transferred to the two large water storage tanks 57 and 58, from where it is pumped by the pumps 59 (i.e., Fybroc pumps of fiber reinforced plastic (FRP) and stainless steel construction) to the lead acid battery manufacturing plants for reuse as process water. The RO reject water is used as cooling water in a smelter afterburner where it is consumed.

The effectiveness of the present invention is demonstrated by the following data.

| Pretreatment Performance | | |
|---|---|---|
| Parameter | Process Waste Water Feed | Effluet Collected in Evaporator Feed Tanks 24 and 25 |
| Antimony | 1.44 ppm | 0.08 ppm |
| Arsenic | 0.2 ppm | 0.06 ppm |
| Cadmium | 0.1 ppm | 0.003 ppm |
| Copper | 2.62 ppm | 0.03 ppm |
| Iron | 56.0 ppm | 0.05 ppm |
| Lead | 185.0 ppm | 0.03 ppm |
| Nickel | 1.2 ppm | 0.2 ppm |
| Zinc | 3.18 ppm | 0.03 ppm |
| Salt Quality | | |
| Sodium Sulfate ($NA_2SO_4$) | 99.7% | |
| Sodium Chloride (NaCl) | 0.200% | |
| Sodium Carbonate ($Na_2CO_3$) | 0.070% | |
| Moisture | 0.0500% | |
| Water Insolubles | 0.010% | |
| Lead | 0.0003% | |
| pH | 7.0–8.5 | |

For illustrative purposes, the above description of the invention has been directed to treating process wastewater generated during the manufacturing and recycling of lead-acid batteries. However, the invention may be applied to treating process wastewater in other metals related industries, such as primary ferrous and non-ferrous metals production, and metal refinishing, industries. That is, the invention may be applied to industries that use acids or bases in a manufacturing process that generates a wastewater stream containing excess metal and dissolved solids.

Advantages

Treatment of process wastewater in accordance with the invention results in a treated effluent that is essentially free of all metals, organics, and other inorganic materials, which allows the treated process wastewater to be returned to production operations, thereby eliminating industrial wastewater discharge into the environment.

In addition, considerable savings may be obtained in that the amount of make-up water required is but a fraction of that needed if the wastewater was discharged into the environment.

In a lead-acid battery manufacturing plant, which may generate hundreds of thousands of gallons of wastewater per day, the invention eliminates the need for discharging millions of gallons of treated wastewater into the environment, which under conventional treatment contains a high concentration of dissolved solids (i.e., calcium sulfate), and residual trace concentrations of metals and other inorganics which represent a potential risk of creating a negative impact on aquatic organisms and drinking water quality.

In accordance with the invention, hazardous materials such as lead in the untreated process wastewater are recovered so that they may be recycled. When compared with conventional treatment processes, where treated wastewater was discharged into the environment, the inventive process eliminates the discharge of about 70 pounds per year of lead into the environment which the conventional processes did not remove and which remained in the wastewater from a battery manufacturing plant that generated one hundred thousand gallons of process wastewater per day. In addition, about 1,000 tons per year of dissolved solids formerly discharged into the environment in discharged process wastewater treated using conventional treatment processes are no longer discharged into the environment in process wastewater using the inventive process.

Under conventional treatment processes, about 4500 tons per year of sludge was generated in a battery manufacturing plant that generated a hundred thousand gallons of wastewater per day, and this sludge was designated as hazardous due to the lead contained in it, thereby creating further treatment and disposal problems. The invention eliminates the generation of hazardous sludge, and in accordance with the invention, lead in the process wastewater is recovered for reuse in new batteries. The sludge generated using the process of the invention is now disposed of by being used as an iron-rich flux in the plants lead smelting operation. The recycling of sludges and lead sediments recovered through the present process through a secondary lead smelter, where one hundred thousand gallons of wastewater where generated per day will recover 59 tons of lead per year for use in manufacturing new batteries.

Because the invention has eliminated the problem of off-site disposal of hazardous wastewater treatment plant sludges, such hazardous materials need no longer be transported over the road to a treatment and/or disposal site thereby enhancing public health and safety by eliminating the potential exposure to the public of these materials if there were a spill during transportation.

Process wastewater treated in accordance with the invention is of such high quality that it contains no measurable concentrations of metals and less than 10 ppm (parts per million) of dissolved solids. The drinking water standard for dissolved solids is 500 ppm (parts per million).

In addition to generating high quality water from process wastewater, the invention generates a pure sodium sulfate salt, which, for example, may be used in the textile, detergent, and paper industries.

It will thus be seen that a process for treating industrial process wastewater and a process wastewater treatment plant have been provided with which the objects of the invention are attained.

I claim:

1. A process wastewater treatment plant for converting wastewater generated in battery manufacturing and other metals related industries into clean process water and sodium sulfate salt, comprising treatment means for treating the process wastewater to remove impurities and contaminants, including debris, oil/grease, heavy metal oxides, lead and other heavy metals, suspended solids, bacteria, organic compounds, and/or gases, from the wastewater to produce a clean neutral sodium sulfate brine, wherein the treatment means includes separating means for separating debris, oil/greases, and heavy metal sediments from the wastewater, chemical treatment means for chemically treating the wastewater to neutralize acid in the wastewater, to coprecipitate iron and other heavy metals in the wastewater into precipitate, and to adsorb heavy metals in the wastewater onto iron solids precipitate, and separating means for separating the heavy metal precipitate from the waste water, ultraviolet light means for subjecting the wastewater to ultraviolet light to kill bacteria in the wastewater, pH adjusting means for adjusting the pH of the wastewater to promote conversion of carbonates and bicarbonates in the wastewater into carbon dioxide, and deaerator means for removing gases from the wastewater, and heating means for subjecting the brine to heat to produce distilled water and sodium sulfate salt wherein the heating means includes evaporation means for evaporating a portion of the wastewater to produce steam and a concentrated sodium sulfate brine, harvesting means for harvesting sodium sulfate salt from the sodium sulfate brine, and collection means for collecting distilled water as the steam produced during evaporation cools.

2. The process wastewater treatment plant of claim 1, further including purifying means for purifying the distilled water by reverse osmosis.

3. The process wastewater treatment plant of claim 1 wherein, the treatment means for removing impurities and contaminants includes filtering means for filtering the wastewater to remove suspended solids.

4. The process wastewater treatment plant of claim 1 wherein, the treatment means for removing impurities and contaminants includes carbon adsorption means for removing trace organic compounds from the wastewater.

5. A process wastewater treatment plant for converting sulfuric acid based process wastewater generated in battery manufacturing and other metals related industries into clean process water and sodium sulfate salt, comprising debris screening means for separating and removing debris in the wastewater, oil/grease separating means for separating and removing oil and grease from the wastewater, lead sediment separating means for separating and removing lead sediments in the wastewater, chemical treatment means for neutralizing acid in the wastewater, for coprecipitating iron and other heavy metals in the wastewater into precipitate, and for causing adsorption of heavy metals in the wastewater onto iron solids precipitate, clarifier means for agglomerating the heavy metal precipitate and for separating the agglomerate heavy metal precipitate from the wastewater, first filter means for removing suspended solids in the wastewater not removed by the clarifier means, ultraviolet purifier means for killing bacteria in the wastewater, second filter means for removing fine particulate not removed by the first filter means, carbon adsorption means for removing trace organic compounds in the wastewater, pH adjustment means for adjusting the pH of the wastewater to promote the conversion of carbonates and bicarbonates in the wastewater into carbon dioxide, deaerator means for removing gases from the wastewater, evaporation means for evaporating a portion of the wastewater to produce steam therefrom, first distilled water collection means for collecting distilled water from the steam produced by the evaporation means as the steam cools, crystallizer means for evaporating another portion of the wastewater to produce steam therefrom and for harvesting sodium sulfate salt from the wastewater, second distilled water collection means for collecting distilled water from the steam produced by the crystallizer means as the steam cools, first transporting means for transporting the wastewater to the debris screening means, from the debris screening means to the oil/grease separating means, from the oil/grease separating means to the lead sediment separating means, from the lead sediment separating means to the chemical treatment means, from the chemical treatment means to the clarifier means, from the clarifier means to the first filter means, from the first filter means to the ultraviolet purifier means, from the ultraviolet purifier means to the second filter means, from the second filter means to the carbon adsorption means, from the carbon adsorption means to the pH adjustment means, from the pH adjustment means to the deaerator means, from the deaerator means to the evaporation means, from the evaporation means to the crystallizer means, reverse osmosis means for removing any remaining traces of contaminants from the distilled water, second transporting means for transporting the distilled water produced by the evaporation means and by the crystallizer means to the reverse osmosis means, and third transporting means for transporting the distilled water from the reverse osmosis means to a holding tank for reuse as process water.

* * * * *